(12) United States Patent
Lundby et al.

(10) Patent No.: US 6,421,327 B1
(45) Date of Patent: Jul. 16, 2002

(54) METHOD AND APPARATUS FOR CONTROLLING TRANSMISSION ENERGY IN A COMMUNICATION SYSTEM EMPLOYING ORTHOGONAL TRANSMIT DIVERSITY

(75) Inventors: Stein A. Lundby; Leonid Razoumov, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/340,759

(22) Filed: Jun. 28, 1999

(51) Int. Cl.[7] .................................................. H04B 7/00
(52) U.S. Cl. ...................................... 370/310; 455/522
(58) Field of Search ................................. 370/208–210, 370/343, 342, 320, 310, 335–338; 455/522, 12, 501, 69, 517, 453, 455, 504; 375/130–136, 203, 340–345, 147

(56) References Cited

U.S. PATENT DOCUMENTS

| 4,901,307 A | 2/1990 | Gilhousen et al. ............ 370/18 |
| 5,056,109 A | 10/1991 | Gilhousen et al. ............ 375/1 |
| 5,101,501 A | 3/1992 | Gilhousen et al. ............ 455/33 |
| 5,103,459 A | 4/1992 | Gilhousen et al. ............ 375/1 |
| 5,109,390 A | 4/1992 | Gilhousen et al. ............ 375/1 |
| 5,280,472 A | 1/1994 | Gilhousen et al. ............ 370/18 |
| 5,305,468 A * | 4/1994 | Bruckert et al. ............... 455/69 |
| 5,584,057 A * | 12/1996 | Dent ........................... 455/101 |
| 5,893,035 A * | 4/1999 | Chen ............................ 455/522 |
| 5,894,473 A * | 4/1999 | Dent ............................ 370/342 |
| 5,982,760 A * | 11/1999 | Chen ............................ 370/335 |
| 5,991,284 A * | 11/1999 | Willenegger et al. ........ 370/335 |
| 6,070,085 A * | 5/2000 | Bender et al. ............... 455/522 |
| 6,075,974 A * | 6/2000 | Saint et al. ..................... 455/69 |
| 6,131,016 A * | 10/2000 | Greenstein et al. ............ 455/69 |
| 6,215,983 B1 * | 3/2001 | Dogan et al. ................... 455/63 |
| 6,249,683 B1 * | 6/2001 | Lundby et al. .............. 455/522 |
| 6,275,543 B1 * | 8/2001 | Petrus et al. ................. 370/310 |

* cited by examiner

Primary Examiner—Kwang Bin Yao
Assistant Examiner—Prenell Jones
(74) Attorney, Agent, or Firm—Philip Wadsworth; Kent D. Baker; Pavel Kalousek

(57) ABSTRACT

The present invention is a novel and improved method and apparatus for control transmission energy. The present invention describes a closed loop power control system that operates in conjunction with a transmitter using orthogonal transmit diversity. In a first embodiment of the present invention, the receiver evaluates the signal to noise ratio (SNR) of the two components of the signal. A weighted sum of these two components emphasizing the weaker of the two signals is generated and used in the generation of the power control commands. In a second embodiment of the present invention, the SNR of the two component signals are calculated and two separate power control commands are generated based on a corresponding one of the calculated SNR values.

23 Claims, 6 Drawing Sheets

METHOD AND APPARATUS FOR CONTROLLING TRANSMISSION ENERGY IN A COMMUNICATION SYSTEM EMPLOYING ORTHOGONAL TRANSMIT DIVERSITY

BACKGROUND OF THE INVENTION

I. Field of the Invention

The present invention relates to communications. More particularly, the present invention relates to a novel and improved method and apparatus for controlling transmission energy in a communications system employing orthogonal transmit diversity.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a remote user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390, entitled "DIVERSITY RECEIVER IN A CDMA CELLULAR TELEPHONE SYSTEM", both assigned to the assignee of the present invention and incorporated by reference herein.

In other modulation schemes such as TDMA, signal diversity acts as noise to the receiver, and as such is highly undesirable. The value of diversity reception in CDMA systems, on the other hand, is so pronounced that systems have been developed to intentionally introduce signal diversity into the transmissions. One method of deliberately introducing signal diversity in a CDMA communication system is to transmit identical signals through separate antennas as described in U.S. Pat. No. 5,280,472, entitled "CDMA Microcellular Telephone System and Distributed Antenna System", which is assigned to the assignee of the present invention and incorporated by reference herein.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission". A second of these proposals was issued by the European Telecommunications Standards Institute (ETSI), entitled "The ETSI UMTS Terrestrial Radio Access (UTRA) ITU-R RTT Candidate Submission".

The Telecommunications Industry Association has developed the initial cdma2000 submission into a draft specification entitled "Proposed Ballot Text for cdma2000 Physical Layer", hereafter referred to as the cdma2000. This draft specification describes a method of providing path and code space diversity referred to as Orthogonal Transmit Diversity (OTD). In OTD, the information to be transmitted to a remote station is demultiplexed into two signals. Each of the two signals is spread using distinct orthogonal spreading sequences and transmitted from different antennas.

A useful method of power control of a remote station in a communication system is to monitor the power of the received signal from the remote station at a base station. The base station in response to the monitored power level transmits power control bits to the remote station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention, of which the disclosure thereof is incorporated by reference herein.

Orthogonal spreading sequences are highly desirable in CDMA communications systems because the cross correlation between any two orthogonal sequences is zero. However, orthogonal sequences have very poor auto correlation properties and in mobile environments that encounter multipath effects the poor auto correlation properties would render a CDMA system inoperable. Because of this effect, a pseudonoise covering that covers the orthogonally spread data is highly desirable. The pseudonoise coverings are selected such that the correlation between the pseudonoise sequence and a time-shifted version of the sequence is low. In new high capacity systems, a method of spreading data so as to evenly distribute the loading on the in-phase and quadrature channels, referred to as complex PN spreading, has been developed. A method and apparatus for performing complex PN spreading is described in detail in copending U.S. patent. application Ser. No. 08/886,604, entitled "HIGH DATA RATE CDMA WIRELESS COMMUNICATION SYSTEM", assigned to the assignee of the present invention and incorporated by reference herein.

SUMMARY OF THE INVENTION

The present invention is a novel and improved method and apparatus for controlling transmission energy. The present invention describes a closed loop power control system that operates in conjunction with a transmitter using orthogonal transmit diversity. In a first embodiment of the present invention, the receiver evaluates the signal to noise ratio (SNR) of the two OTD components of the signal. A weighted sum of these two components emphasizing the weaker of the two signals is generated and used in the generation of the power control commands. In a second embodiment of the present invention, the SNR of the two component signals are calculated and two separate power control commands are generated based on the corresponding calculated SNR values.

BRIEF DESCRIPTION OF THE DRAWINGS

The features, objectives, and advantages of the present invention will become more apparent from the detailed description set forth below when taken in conjunction with the drawings in which like reference characters are identified correspondingly throughout and wherein.

DETAILED DESCRIPTION OF THE PREFERRED EMBODIMENTS

Figure 1:
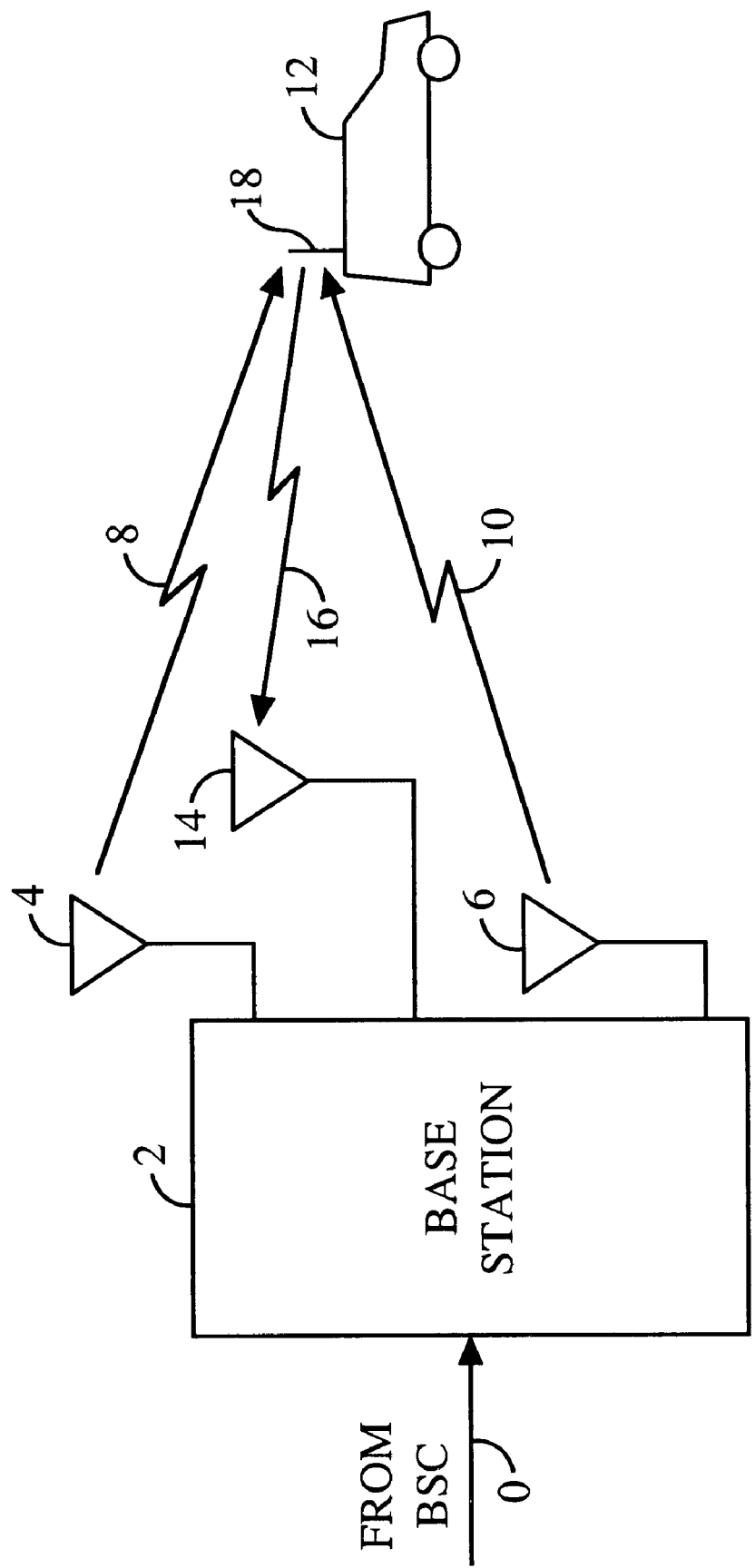
FIG. 1 is a diagram of a communications system using orthogonal transmit diversity.

FIG. 1 illustrates the primary elements in a wireless communication system employing OTD on the forward link. A signal 0 to be transmitted is provided by a base station controller (not shown) to a base station 2. Base station 2 de-multiplexes the signal for provision on two paths, spreads each of the de-multiplexed portions using a different spreading code, and after additional processing provides a first de-multiplexed portion of signal 0 to antenna 4 and a second de-multiplexed portion of signal 0 to antenna 6.

The signal from the antenna 4 is transmitted as forward link signal 8 and the signal from the antenna 6 is transmitted as forward link signal 10. Thus, the signals emanating from the base station 2 possess both code and space diversity with respect to each other. It should be noted that OTD is not true signal diversity in the sense that the information carried on the two forward link signals 8 and 10 is different. This lack of true signal diversity is a primary motivation for the present invention because it provides for the requirement that both forward link signal 8 and forward link signal 10 be capable of reliable reception simultaneously. In true signal diversity situations where the information transmitted on forward link signals 8 and 10 is redundant, the only requirement would be that either forward link signal 8 or forward link signal 10 be capable of reliable reception at any given time.

Forward link signals 8 and 10 are received by remote station 12. Remote station 12 receives and demodulates forward link signals 8 and 10, and combines the demodulated signals to provide an estimate of signal 0. In addition, remote station 12 determines the adequacy of the transmission energy of the signals transmitted by base station 2, and generates a series of power control commands in accordance with this determination. This method of controlling the energy of transmissions from base station 2 is referred to as closed loop power control, and an implementation of a closed loop power control system is described in detail in aforementioned U.S. Pat. No. 5,056,109.

Remote station 12 computes an estimate of the SNRs of the forward link signals 8 and 10, which are used for determination of a feedback power control command or commands. The power control command is subsequently processed by the remote station 12 and transmitted to the base station 2 on reverse link signal 16. Reverse link signal 16 is received by antenna 14, and provided to base station 2. Base station 2 receives and demodulates the power control command, and adjusts the transmission energy of forward link signals 8 and 10 in accordance with the received power control commands.

Figure 2:
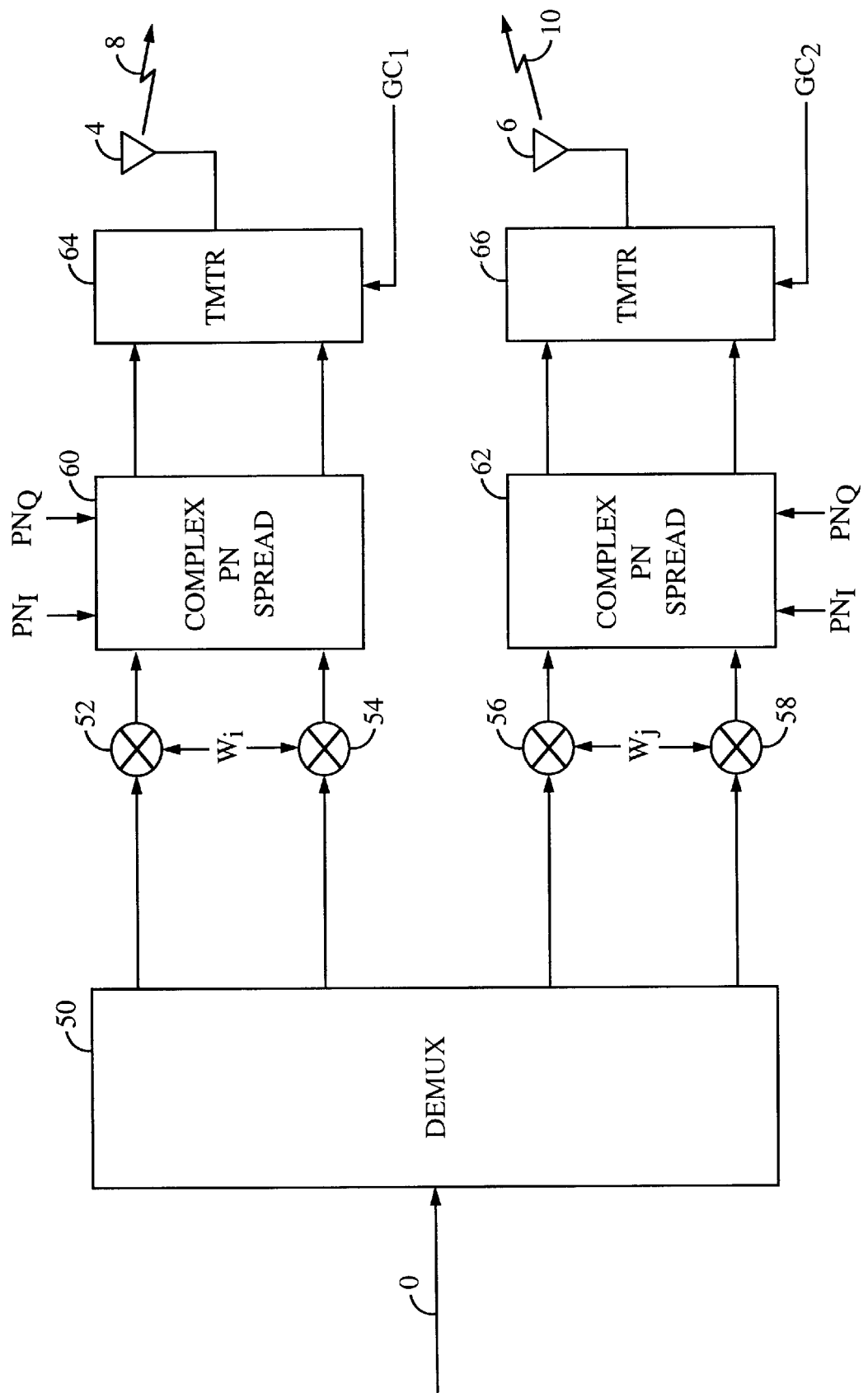
FIG. 2 is a transmission system using orthogonal transmit diversity.

FIG. 2 illustrates in greater detail processing of a signal to be transmitted by base station 2. The signal 0 is provided to a de-multiplexer 50, which outputs four de-multiplexed components. Each of the de-multiplexed components of signal 0 is then provided to a corresponding one of spreaders 52, 54, 56, and 58. It will be understood by one skilled in the art that processing of the signal 0 including forward error correction coding, interleaving, and rate matching are performed prior to the signal's provision to de-multiplexer 50. Implementation of such processing is well known in the art and is not the subject of the present invention.

In order to allow remote station 12 to coherently demodulate forward link signals 8 and 10, pilot signals must also be transmitted from each of antennas 4 and 6. In the preferred embodiment, a common pilot is transmitted from antenna 4 using the Walsh zero ($W_0$), or all ones sequence, and a second pilot using an auxiliary pilot structure is transmitted from antenna 6. The use of a common pilot generated using the all ones sequences is described in detail in the aforementioned U.S. Pat. No. 5,103,459, and the generation and use of auxiliary pilots is described in detail in U.S. Pat. No. 6,285,655, entitled "METHOD AND APPARATUS FOR PROVIDING ORTHOGONAL SPOT BEAMS, SECTORS AND PICOCELLS," which is assigned to the assignee of the present invention and incorporated by reference herein.

Spreaders 52 and 54 spread the first two components of signal 0 using spreading sequence $W_i$. Spreaders 56 and 58 spread the second two components of signal 0 using a second code $W_j$. Note that the use of two different codes $W_i$, and $W_j$, provides code diversity. In the exemplary embodiment, $W_i$ and $W_j$ take the form of either orthogonal functions or quasi orthogonal functions. The generation of orthogonal functions is well known in the art and is described in aforementioned U.S. Pat. No. 5,103,459. Quasi-orthogonal functions are sequences that have minimum correlation to a set of orthogonal sequences. The generation of quasi orthogonal functions is described in detail in U.S. Pat. No. 6,157,611, entitled "METHOD AND APPARATUS FOR CONSTRUCTION OF QUASI-ORTHOGONAL VECTOR", which is assigned to the assignee of the present invention and incorporated by reference herein.

Spread signals from spreaders 52 and 54 are provided to complex pseudonoise (PN) spreader 60. Complex PN spreader 60 spreads the signals in accordance with PN sequences $PN_I$, and $PN_Q$. Complex PN spreading is well known in the art and is described in the cdma2000 Candidate Submission and in the aforementioned copending U.S. patent application Ser. No. 08/886,604. The complex PN spread signals are provided to a transmitter (TMTR) 64. TMTR 64 up-converts, amplifies, and filters the signals in accordance with a QPSK modulation format, and provides the processed signals to an antenna 4 for transmission as forward link signal 8. The amount of amplification is determined in accordance with gain control commands $GC_1$.

Similarly, spread signals from spreaders 56 and 58 are provided to complex PN spreader 62. Complex PN spreader 62 spreads the signals in accordance with PN sequences $PN_I$ and $PN_Q$. The complex PN spread signals are provided to a TMTR 66. Transmitter 66 up-converts, amplifies, and filters the signals in accordance with a QPSK modulation format, and provides the processed signals to antenna 6 for transmission as forward link signal 10. The amount of amplification is determined in accordance with power control command $GC_2$.

Figure 3:
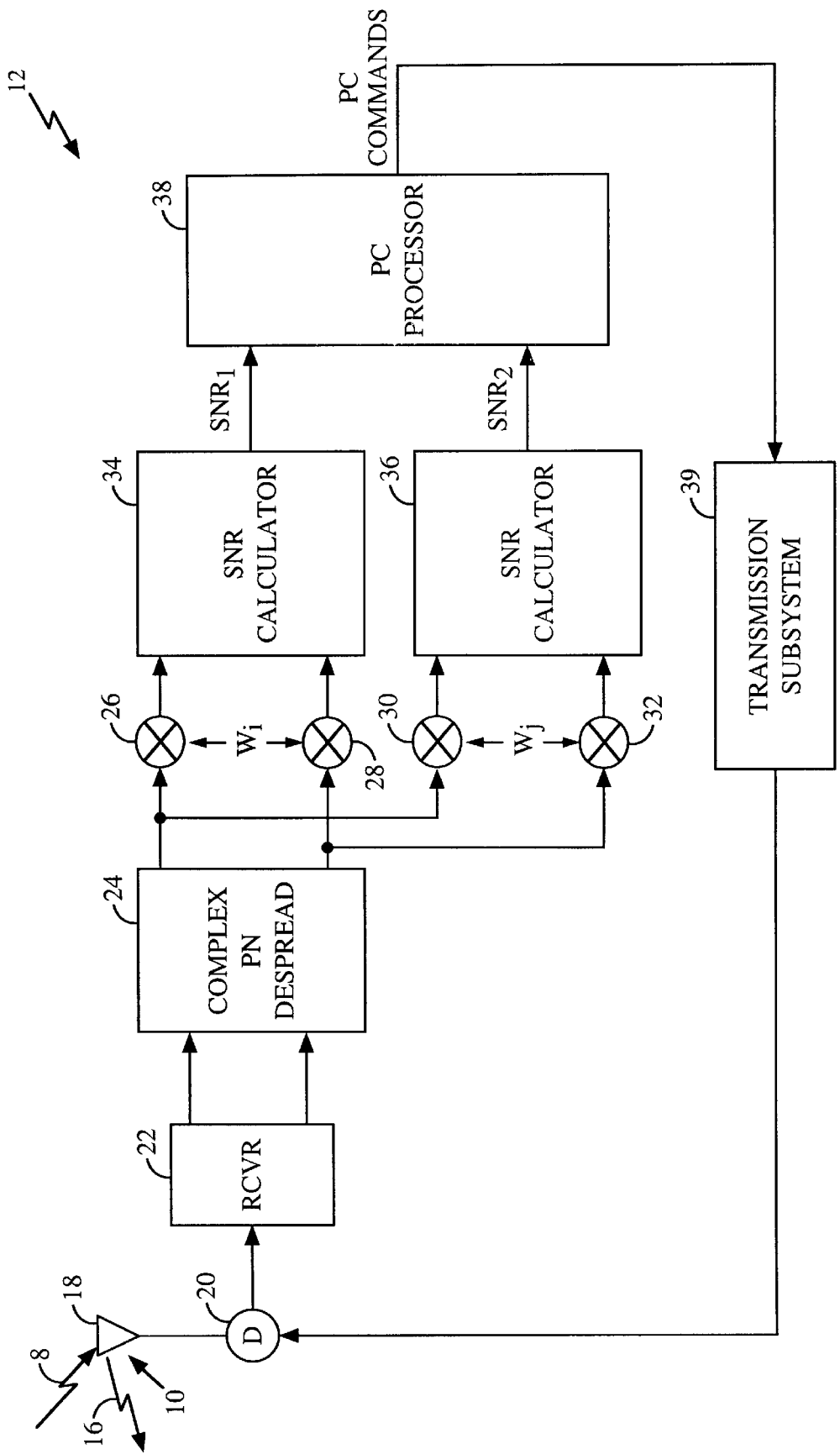
FIG. 3 is a portion of the receiving station of the present invention for calculating the closed loop power control commands.

FIG. 3 illustrates in greater detail processing of signals by remote station 12. Forward link signals 8 and 10 are received at remote station 12 by antenna 18, and provided through duplexer 20 to receiver (RCVR) 22. Receiver 22 down-converts, amplifies, and filters the received signals in accordance with a QPSK demodulation scheme, and provides the received signal to complex PN de-spreader 24. The implementation of complex PN despreader 24 is well known in the art, and is described in detail in copending U.S. patent application Ser. No. 08/886,604.

A first component of the complex PN de-spread signal is provided to despreader 26 and despreader 28. Despreaders 26 and 28 despread the signal in accordance with a first code $W_i$. A second component of the complex PN de-spread signal is provided to despreader 30 and despreader 32. Despreaders 30 and 32 despread the signal in accordance with a second code $W_j$. The implementation of despreaders 26, 28, 30 and 32 are well known in the art, and is described in detail aforementioned U.S. Pat. No. 5,103,459. In addition, similar despreading operation is performed on the pilot channels using the Walsh sequences used to spread the pilot symbols.

The signals output from spreaders 26 and 28 are provided to a SNR calculator 34, which calculates an estimate of the signal to noise ratio of forward link signal 8 ($SNR_1$). The signals output from spreaders 30 and 32 are provided to a SNR calculator 36, which calculates an estimate of the signal to noise ratio of forward link signal 10 ($SNR_2$).

In the exemplary embodiment, the noise energy is measured by calculating the signal variance of the pilot channel that is transmitted with fixed energy. Measurement of the noise energy using the variance of the pilot signal is described in detail U.S. Pat. No. 5,903,554, entitled "METHOD AND APPARATUS FOR MEASURING LINK QUALITY IN A SPREAD SPECTRUM COMMUNICATION SYSTEM", which is assigned to the assignee of the present invention and incorporated by reference herein. The bit energy is computed by measuring the energy of the punctured power control bits that are transmitted at the energy of a full rate transmission regardless of the rate of the underlying traffic. A preferred embodiment of the method for determining bit energy from the punctured power control symbols is described in copending U.S. patent application Ser. No. 09/239,451, entitled "METHOD AND APPARATUS FOR CONTROLLING TRANSMISSION POWER IN A CDMA COMMUNICATION SYSTEM", which is assigned to the assignee of the present invention and incorporated by reference herein. The present invention is applicable to other methods of determining signal to noise ratio in a CDMA communications system.

The estimated $SNR_1$ and $SNR_2$ are then provided to power control processor 38, which outputs power control command.

Figure 5:
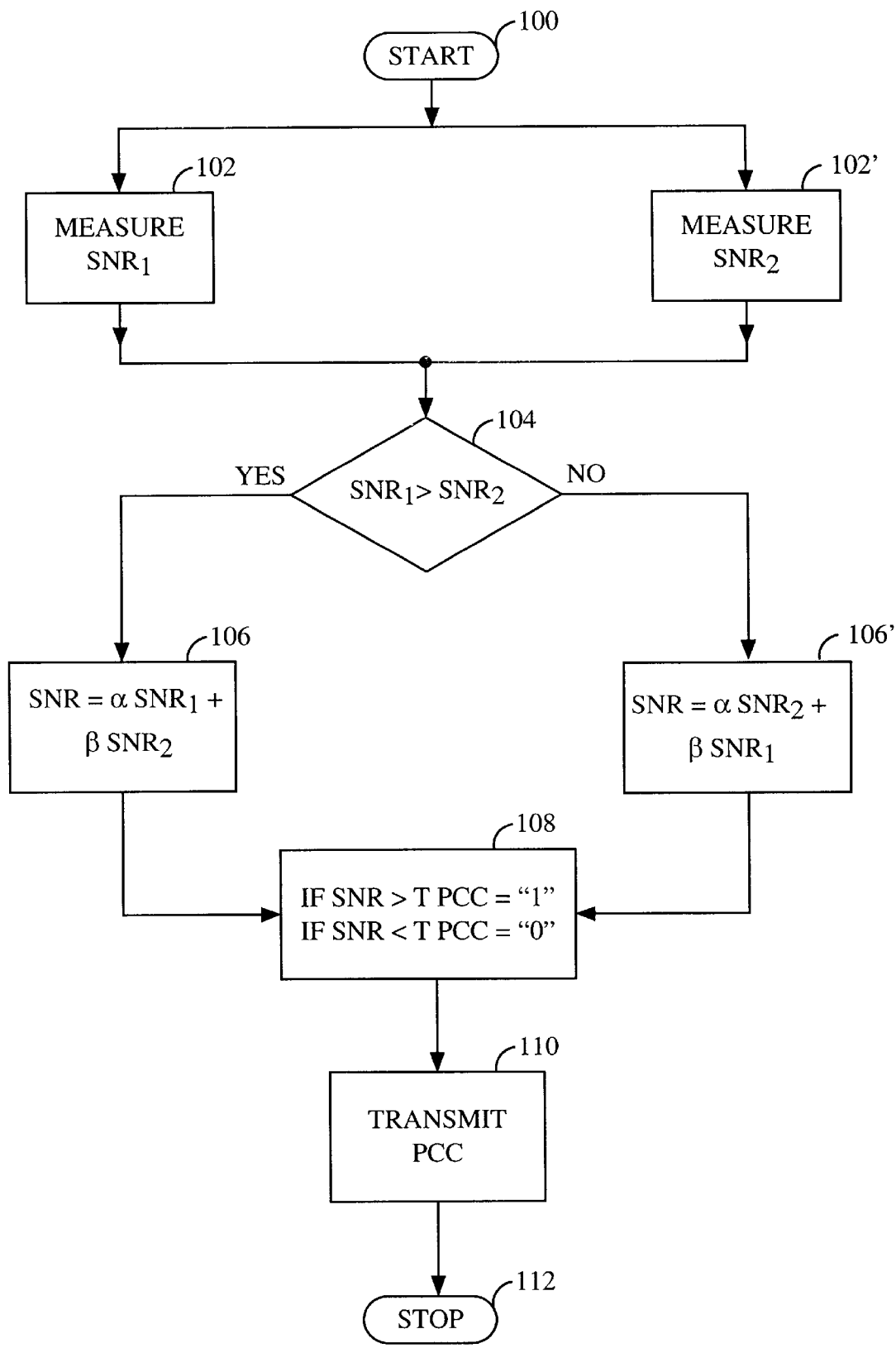
FIG. 5 is a flowchart illustrating a first method of determining the value of the power control command of the present invention.

One embodiment of the process used by the power control processor 38 in determination of the power control commands is illustrated in FIG. 5. The algorithm starts in block 100. In block 102, the signal-to-noise ratio of forward link signal 8 ($SNR_1$) is measured. In block 102', the signal-to-noise ratio of forward link signal 10 ($SNR_2$) is measured. In block 104, the two signal-to-noise ratios, $SNR_1$ and $SNR_2$, are compared. If $SNR_1$ is greater than $SNR_2$, a composite SNR is calculated in block 106 using the formula:

$$SNR=\alpha SNR_1+\beta SNR_2, \qquad (1)$$

where in the preferred embodiment, $\beta$ is greater than $\alpha$. In the exemplary embodiment, $\beta$ is equal to 0.7 and $\alpha$ is equal to 0.3. This method emphasizes the SNR of the weaker signal, which is consistent with the goal of ensuring that both signals are of sufficient strength to be reliably received. If $SNR_1$ is less than $SNR_2$, a composite SNR is calculated in block 106' using the expression given in equation (2):

$$SNR=\alpha SNR_2+\beta SNR_1, \qquad (2)$$

where again $\beta$ is greater than $\alpha$.

In block 108, the composite SNR is compared to a predetermined threshold T. If the composite SNR is greater than T, the power control command (PCC) is set to 1. If SNR is less than T, PCC is set to 0. In block 110, the PCC is transmitted and the algorithm terminates in block 112.

Figure 6:
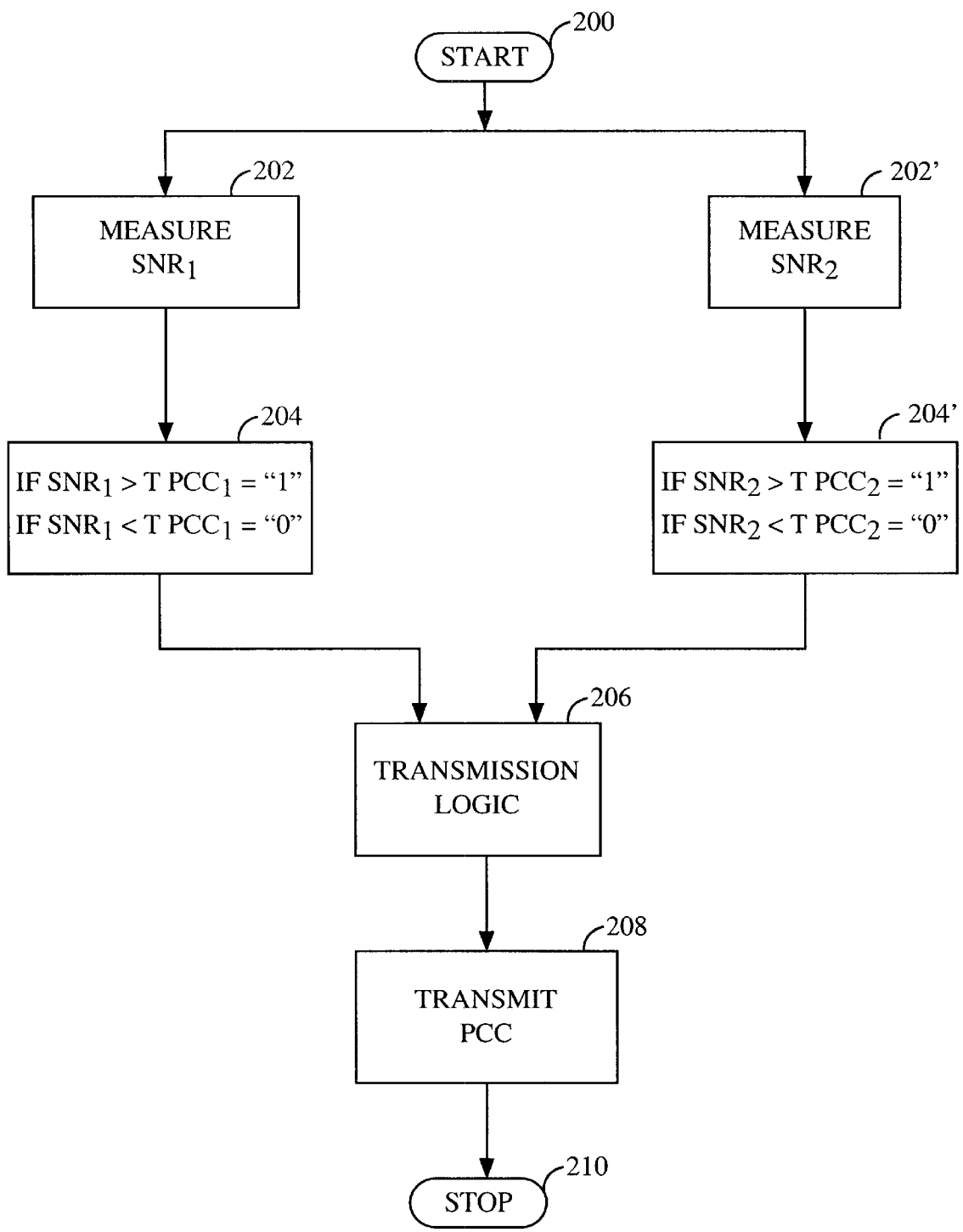
FIG. 6 is a flowchart illustrating a second method of determining the value of the power control command of the present invention.

FIG. 6 depicts a flowchart, illustrating another embodiment of the invention. The algorithm starts in block 200. In block 202, the signal-to-noise ratio of forward link signal 8 ($SNR_1$) is measured. In block 202', the signal-to-noise ratio of forward link signal 10 ($SNR_2$) is measured.

In block 204, $SNR_1$ is compared to a predetermined threshold T. If $SNR_1$ is greater than T, a first power control command ($PCC_1$) is set to 1. If $SNR_1$ is less than T, $PCC_1$ is set to 0. In block 204', $SNR_2$ is compared to a predetermined threshold T. If $SNR_2$ is greater than T, a second power control command ($PCC_2$) is set to 1. If SNR is less than T, $PCC_2$ is set to 0.

In block 206, a PCC transmission decision is made. In one embodiment of the invention, only one power control bit per power control group is transmitted. In this embodiment, the PCC is alternatively set to $PCC_1$ and then $PCC_2$. In another embodiment of the invention, two power control bits per power control group are transmitted. In this embodiment, the PCC contains an ordered pair, such as $PCC_1$, $PCC_2$. In block 208, the PCC is transmitted. The algorithm terminates in block 210.

The power control command or commands are then provided to transmission sub-system 39 of FIG. 3. Transmission sub-system 39 modulates, up-converts, amplifies and filters the power control command and provides the processed signals through duplexer 20 to antenna 18 for transmission as reverse link signal 16.

Figure 4:
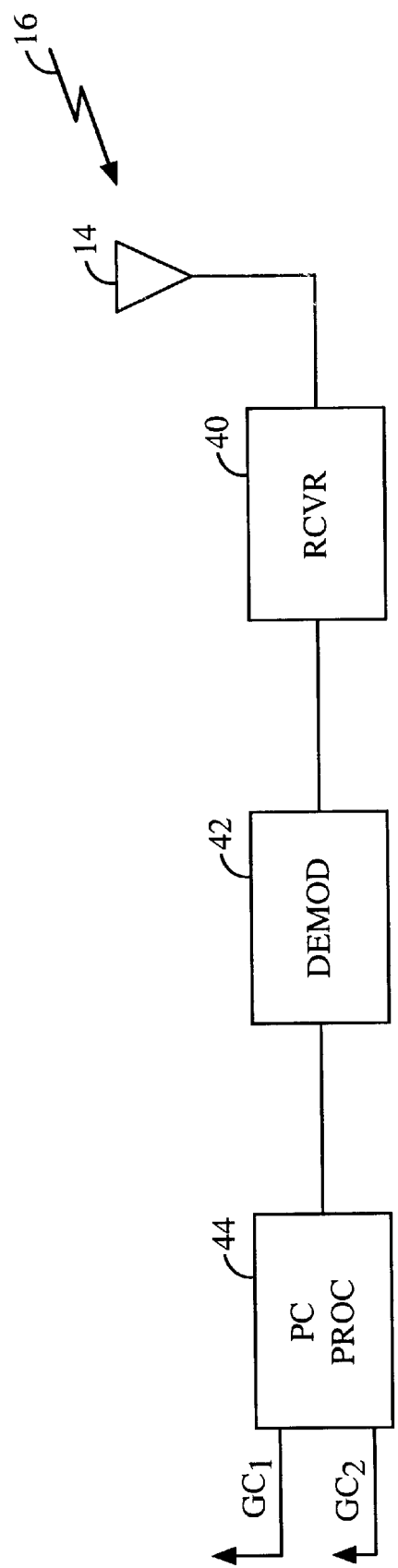
FIG. 4 is a receiver system for receiving the closed loop power control commands and controlling the transmission energy of the amplifiers of FIG. 2.

Turning to FIG. 4, reverse link signal 16 is received at antenna 14, and is provided to a receiver (RCVR) 40. RCVR 40 down-converts, amplifies, and filters the signal in accordance with a QPSK demodulation format, and provides the received signal to demodulator 42. Demodulator 42 demodulates the signal in accordance with CDMA demodulation format. Power control commands are then extracted from the demodulated signal and provided to transmitters 64 and 66 of FIG. 2 as signals $GC_1$ and $GC_2$. In response to the received power control commands, transmitters 64 and 66 adjust their transmission energies up or down in a predetermined fashion.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for controlling a transmission power of a base station by a remote station in a communication system comprising the steps of:

(a) transmitting from said base station a signal over a plurality of links;

(b) receiving at said remote station said signal over said plurality of links;

(c) estimating a signal-to-noise ratio (SNR) of said signal for each of said plurality of links;

(d) determining a power control command as a weighted sum of each of said SNRs;

(e) transmitting said power control command to said base station; and (f) adjusting at said base station said transmission power based on said received power control command.

2. The method of claim 1 wherein step (d) comprises the steps of:

(a) arranging said SNR into a first ordered set based on said SNR magnitudes;

(b) forming a second ordered set containing constants, said second ordered set being ordered in opposite sequence of magnitudes as said first ordered set, and having an equal number of members as said first ordered set;

(c) calculating a composite SNR by multiplying each member of said first ordered set by a member on corresponding position of said second ordered set, and summing products of said multiplication;

(d) comparing said composite SNR to a threshold; and (e) setting said power control command to a first value if said composite SNR is less than said threshold, or setting said power control command to a second value if said composite SNR is greater than said threshold.

3. The method of claim 2 wherein said plurality of links is equal to two.

4. The method of claim 3 wherein one of said constants of said second ordered set is equal to 0.3, and another of said constants of said second ordered set is equal to 0.7.

5. A method for controlling a transmission power of a base station by a remote station in a communication system comprising the steps of:

(a) transmitting from said base station a signal over a plurality of links;

(b) receiving at said remote station said signal over said plurality of links;

(c) estimating a SNR of said signal for each of said plurality of links;

(d) determining a power control command from a combination of signals that are functions of said SNRs;

(e) transmitting said power control command to said base station; and (f) adjusting at said base station said transmission power based on said received power control command.

6. The method of claim 5 wherein step (d) comprises the steps of:

(a) comparing said SNR of one of said plurality of links to a threshold;

(b) setting a corresponding power control command to a first value if said SNR is less than said threshold, or setting said corresponding power control command to a second value if said SNR is greater than said threshold;

(c) repeating steps (a) and (b) for all of said plurality of inks; and (d) assigning said power control commands sequentially to a power control group to be transmitted.

7. The method of claim 5 wherein step (d) comprises the steps of:

(a) comparing said SNR of one of said plurality of links to a threshold;

(b) setting a corresponding power control command to a first value if said SNR is less than said threshold, or setting said corresponding power control command to a second value if said SNR is greater than said threshold;

(c) repeating steps (a) and (b) for all of said plurality of links; and (d) assigning a set comprising all of said power control commands to a power control group to be transmitted.

8. A method for controlling a transmission power of a base station containing a plurality of transmitters comprising the steps of:

(a) receiving at said base station a signal containing a power control command;

(b) determining for which of said plurality of transmitters said power control command is directed; and (c) adjusting said transmission power of said transmitters.

9. A method for generating a power control command at a remote station for a base station containing a plurality of transmitters comprising the steps of:

(a) receiving at said remote station a signal over a plurality of links;

(b) estimating a SNR of said signal for each of said plurality of links;

(c) arranging said SNRs into a first ordered set based on said SNR magnitudes;

(d) forming a second ordered set containing constants, said second ordered set being ordered in opposite sequence of magnitudes as said first ordered set, and having equal number of members as said first set;

(e) calculating a composite SNR by multiplying each member of said first ordered set by a member on corresponding position of said second ordered set, and summing products of said multiplication;

(f) comparing said composite SNR to a threshold, and (g) setting said power control command to a first value if said composite SNR is less than said threshold, or setting said power control command to a second value if said composite SNR is greater than said threshold.

10. The method of claim 9 wherein steps (c) through (g) are replaced. by the steps of:

(a) comparing said SNR of one of plurality of links to a threshold;

(b) setting a corresponding power control command to a first value if said SNR is less than said threshold, or setting said corresponding power control command to a second value if said SNR is greater than said threshold;

(c) repeating steps (a) and (b) for all of said plurality of links; and (d) assigning said power control commands sequentially to a power control group to be transmitted.

11. The method of claim 10 wherein step (d) comprises the step of:
   (a) comparing said SNR of one of plurality of links to a threshold;
   (e) setting a corresponding power control command to a first value if said SNR is less than said threshold, or setting said corresponding power control command to a second value if said SNR is greater than said threshold;
   (f) repeating steps (a) and (b) for all of said plurality of links; and
   (g) assigning a set comprising all said power control commands to a power control group to be transmitted.

12. An apparatus for controlling a transmission power of a base station by a remote station in a communication system, comprising:
   (1) a first power control processor capable of executing the functions of:
      (a) accepting a plurality of SNRs;
      (b) determining a power control command as a weighted sum of each of said SNRs; and
      (c) communicating said power control command; and
   (2) a second control processor capable of executing the functions of:
      (a) accepting a signal containing said power control command;
      (b) determining for which of a plurality of transmitters said power control command is directed; and
      (c) adjusting said transmission power of said transmitters.

13. The apparatus of claim 12 wherein said first power control processor is capable of executing function (b) by:
   (a) arranging said SNRs into a first ordered set based on said SNR magnitudes;
   (b) forming a second ordered set containing constants, said second ordered set being ordered in opposite sequence of magnitudes as said first ordered set, and having equal number of members as said first set;
   (c) calculating a composite SNR by multiplying each member of said first ordered set by a member on corresponding position of said second ordered set, and summing products of said multiplication;
   (d) comparing said composite SNR to a threshold; and
   (e) setting said power control command to a first value if said composite SNR is less than said threshold, or setting said power control command to a second value if said composite SNR is greater than said threshold.

14. The apparatus of claim 13 wherein said plurality of SNRs is equal to two.

15. The apparatus of claim 13 wherein one of said constants of said second ordered set is equal to 0.3, and another of said constants of said second ordered set is equal to 0.7.

16. An apparatus for controlling a transmission power of a base station by a remote station in a communication system, comprising:
   (1) a first power control processor capable of executing the functions of:
      (a) accepting a plurality of SNRs;
      (b) determining a power control command from a combination of signals that are functions of said SNRs;
      (c) communicating said power control command;
   (2) a second control processor capable of executing the functions of:
      (a) accepting a signal containing said power control command;
      (b) determining for which of a plurality of transmitters said power control command is directed; and
      (c) adjusting said transmission power of said transmitters.

17. The apparatus of claim 16 wherein said first power control processor is capable of executing function (b) by:
   (a) comparing said SNR of one of plurality of said links to a threshold;
   (b) setting a corresponding power control command to a first value if said SNR is less than said threshold, or setting said corresponding power control command to a second value if said SNR is greater than said threshold;
   (c) repeating steps (a) and (b) for all of said plurality of links; and
   (d) assigning said power control commands sequentially to a power control group to be transmitted.

18. The apparatus of claim 16 wherein said first power control processor is capable of executing function (b) by:
   (a) comparing said SNR of one of said plurality of links to a threshold;
   (b) setting a corresponding power control command to a first value if said SNR is less than said threshold, or setting said corresponding power control command to a second value if said SNR is greater than said threshold;
   (c) repeating steps (a) and (b) for all of said plurality of links; and
   (d) assigning a set comprising all of said power control commands to a power control group to be transmitted.

19. An apparatus for generating a power control command at a remote station in a communication system, comprising a first power control processor capable of executing the functions of:
   (a) accepting a plurality of SNRs from a plurality of links;
   (b) determining a power control command as a weighted sum of each of said SNRs; and
   (c) communicating said power control command.

20. The apparatus of claim 19 wherein said first power control processor is capable of executing function (b) by:
   (a) arranging said SNRs into a first ordered set based on said SNR magnitudes;
   (b) forming a second ordered set containing constants, said second ordered set being ordered in opposite sequence of magnitudes as said first ordered set, and having equal number of members as said first set;
   (c) calculating a composite SNR by multiplying each member of said first ordered set by a member on corresponding position of said second ordered set, and summing products of said multiplication;
   (d) comparing said composite SNR to a threshold; and
   (e) to set said power control command to a first value if said composite SNR is less than said threshold, or setting said power control command to a second value if said composite SNR is greater than said threshold.

21. An apparatus for generating a power control command at a remote station in a communication system, comprising a first power control processor capable of executing the functions of:
   (a) accepting a plurality of SNRs, from a plurality of links;

(b) determining a power control command from a combination of signals that are functions of said SNRs; and (c) communicating said power control command.

22. The apparatus of claim 21 wherein said first power control processor is capable of executing function (b) by:

(a) comparing said SNR of one of plurality of said links to a threshold;

(b) setting a corresponding power control command to a first value if said SNR is less than said threshold, or setting said corresponding power control command to a second value if said SNR is greater than said threshold;

(c) repeating steps (a) and (b) for all of said plurality of links; and (d) assigning said power control commands sequentially to a power control group to be transmitted.

23. The apparatus of claim 21 wherein said first power control processor is capable of executing function (b) by:

(a) comparing said SNR of one of said plurality of links to a threshold;

(b) setting a corresponding power control command to a first value if said SNR is less than said threshold, or setting said corresponding power control command to a second value if said SNR is greater than said threshold;

(c) repeating steps (a and b) for all of said plurality of links; and (d) assigning a set comprising all of said power control commands to a power control group to be transmitted.

* * * * *